(12) United States Patent
Kim et al.

(10) Patent No.: US 8,654,177 B2
(45) Date of Patent: Feb. 18, 2014

(54) FLEXIBLE IMAGE PHOTOGRAPHING APPARATUS WITH A PLURALITY OF IMAGE FORMING UNITS AND METHOD FOR MANUFACTURING THE SAME

(75) Inventors: Woon-bae Kim, Suwon-si (KR);
Seung-wan Lee, Suwon-si (KR);
Min-seog Choi, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1113 days.

(21) Appl. No.: 12/370,998

(22) Filed: Feb. 13, 2009

(65) Prior Publication Data
US 2010/0007714 A1    Jan. 14, 2010

(30) Foreign Application Priority Data
Jul. 10, 2008  (KR) .................. 10-2008-0067170

(51) Int. Cl.
*H04N 5/225* (2006.01)
*H04N 7/00* (2011.01)

(52) U.S. Cl.
USPC ............................. 348/36; 348/335; 348/373

(58) Field of Classification Search
USPC ........................... 348/36, 335, 376, 373–374
See application file for complete search history.

(56) References Cited

U.S. PATENT DOCUMENTS

| | | | |
|---|---|---|---|
| 5,495,576 A * | 2/1996 | Ritchey | 345/420 |
| 5,694,620 A * | 12/1997 | Wilk et al. | 396/6 |
| 6,765,617 B1 * | 7/2004 | Tangen et al. | 348/340 |
| 6,788,333 B1 * | 9/2004 | Uyttendaele et al. | 348/36 |
| 6,933,966 B2 * | 8/2005 | Taylor | 348/159 |
| 7,256,895 B2 * | 8/2007 | Castonguay | 356/511 |
| 7,471,661 B1 * | 12/2008 | Wang et al. | 370/338 |
| 7,564,496 B2 * | 7/2009 | Wolterink et al. | 348/340 |
| 7,583,862 B2 * | 9/2009 | Tuttle et al. | 382/312 |
| 7,683,961 B2 * | 3/2010 | Hartlove et al. | 348/340 |
| 7,688,229 B2 * | 3/2010 | Sula et al. | 340/995.17 |
| 8,531,580 B2 * | 9/2013 | Choi et al. | 348/340 |
| 2002/0126458 A1 * | 9/2002 | Sasaki | 361/735 |
| 2003/0071896 A1 * | 4/2003 | Hunter | 348/88 |
| 2005/0254133 A1 * | 11/2005 | Akram et al. | 359/626 |
| 2006/0268102 A1 * | 11/2006 | Ginther | 348/36 |
| 2009/0066797 A1 * | 3/2009 | Miyachi et al. | 348/207.99 |

FOREIGN PATENT DOCUMENTS

| | | | |
|---|---|---|---|
| KR | 10-2000-0049968 A | 8/2000 | |
| KR | 10-2005-0110901 A | 11/2005 | |

* cited by examiner

*Primary Examiner* — Patrice Winder
(74) *Attorney, Agent, or Firm* — Sughrue Mion, PLLC (57) ABSTRACT

A flexible image photographing apparatus includes a plurality of image photographing units to photograph a photographing object. A flexible body receives the plurality of image photographing units and may be transformed when a force is applied. A control portion is disposed at the flexible body to control each of the plurality of image photographing units to photograph the photographing object. The control portion stores images of the photographing object and performs various kinds of photography.

23 Claims, 10 Drawing Sheets

FLEXIBLE IMAGE PHOTOGRAPHING APPARATUS WITH A PLURALITY OF IMAGE FORMING UNITS AND METHOD FOR MANUFACTURING THE SAME

CROSS-REFERENCE TO RELATED APPLICATION

This application claims priority from Korean Patent Application No. 10-2008-0067170 filed Jul. 10, 2008 in the Korean Intellectual Property Office, the disclosure of which is incorporated herein by reference in its entirety.

BACKGROUND

1. Field

Methods and apparatuses consistent with the invention relate to an image photographing, and more particularly, to a flexible image photographing apparatus having a plurality of image photographing units and a flexible body capable of being transformed.

2. Description of the Related Art

Generally, image photographing apparatuses such as a digital camera, a digital camcorder, etc. use an image sensor to convert light which enters through a lens into electrical signal, and store the electrical signal in a memory, etc., thereby providing still images or moving images of the objects.

The conventional image photographing apparatus has an image photographing unit to convert light into images. The image photographing unit includes an image sensor, and a lens portion to allow light to enter the image sensor from outside.

Because the conventional image photographing apparatus has only one image photographing unit, to perform a panoramic photography is difficult, and to perform a stereo photography (or three-dimensional photography) is not always possible.

Also, because the conventional image photographing apparatus has an angle of view of approximate 60 degrees, when the conventional image photographing apparatus is used for videoconferencing, each videoconferencing person needs to use one image photographing apparatus. Therefore, for a number of people which perform videoconference with other people in a separate location, a specific conference room having a plurality of image photographing apparatuses is required. That is, the conventional image photographing apparatus has a place limit for videoconferencing.

SUMMARY

The invention provides a flexible image photographing apparatus that has a plurality of image photographing units being disposed at a flexible body and can perform a special photography such as a panoramic photography, a stereo photography, etc., and a method for manufacturing the flexible image photographing apparatus.

The aspects of the invention may be achieved by providing a flexible image photographing apparatus, which includes a plurality of image photographing units formed to photograph a photographing object; a flexible body to receive the plurality of image photographing units, the flexible body formed to be transformed when a force is applied; and a control portion disposed at the flexible body, the control portion to control the plurality of image photographing units to photograph the photographing object and to store images of the photographing object.

Each of the plurality of image photographing units may include; an image sensor to convert light reflected by the photographing object into electrical signal; and a lens portion disposed in front of the image sensor, the lens portion to have at least one lens to allow the light to enter the image sensor.

The image sensor of one image photographing unit among the plurality of image photographing units may have resolution higher than the image sensor of each of the other image photographing units.

The image sensors of the plurality of image photographing units all may have the same resolution.

The image sensors of the plurality of image photographing units all may have resolution different from one another.

Each of the plurality of image photographing units may include at least one function among an auto focusing function, a mechanical shutter function, or a zooming function.

The lens portions of the plurality of image photographing units all may have focusing distance and magnification different from one another.

After the force is removed, the flexible body may maintain the transformed shape.

After the force is removed, the flexible body may restore to an original state.

The control portion may be formed of a flexible printed circuit board.

The flexible body may include a display unit to display the images photographed by the plurality of image photographing units.

The display unit may be transformed integrally with the flexible body.

The display unit may be formed of a hard material not transformed integrally with the flexible body and the display unit is disposed to rotate with respect to the flexible body, wherein after the display unit is separated from a rear surface of the flexible body, the flexible body can be transformed.

The control portion may control the plurality of image photographing units to photograph the photographing object at the same time. The control portion may divide the plurality of image photographing units into at least two groups of image photographing units and control the at least two groups thereof to photograph the photographing object in regular sequence.

The control portion may control the plurality of image photographing units to perform a panoramic photography, a three-dimensional photography, or a super-macro photography.

Each of the plurality of image photographing units may be disposed at the flexible body and is exchangeable.

The flexible image photographing apparatus may include a transformation driving portion to transform the flexible body corresponding to a signal from the control portion.

The transformation driving portion may include an electroactive polymer, a piexoelectric material, a shape memory alloy, or a motor driving structure.

According to another exemplary aspect of the invention, a method for manufacturing a flexible image photographing apparatus, may includes: manufacturing a plurality of image photographing units at a wafer level; attaching a supporting film on top surfaces of the plurality of image photographing units; cutting the plurality of image photographing units manufactured at a wafer level so that the plurality of image photographing units is connected with one another only by the supporting film; filling a flexible material around each of the plurality of image photographing units to form a flexible body while top and bottom of each of the plurality of image photographing units maintains an uncovered state; removing the supporting film; and attaching a control portion formed of a flexible printed circuit board to a rear surface of the flexible body.

After the supporting film is removed, a blocking layer to protect the plurality of image photographing units may be formed at a top surface of the flexible body.

The method for manufacturing a flexible image photographing apparatus, may include disposing a flexible rear housing at a bottom surface of the control portion.

According to another exemplary aspect of the invention, a method for manufacturing a flexible image photographing apparatus, may include: manufacturing a plurality of image photographing units; preparing a body assembly including a control portion and a flexible body in a process separated from a process in which the plurality of image photographing units is manufactured; and installing the plurality of image photographing units to the flexible body.

The flexible body may include a plurality of sockets in which the plurality of image photographing units is detachably installed.

Other objects, advantages and salient features of the invention will become apparent from the following detailed description, which, taken in conjunction with the annexed drawings, describes exemplary embodiments of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawings of which.

Throughout the drawings, like reference numerals will be understood to refer to like parts, components and structures.

DETAILED DESCRIPTION

Hereinafter, exemplary embodiments of the invention will be described in detail with reference to the accompanying drawings.

The matters defined in the description, such as a detailed construction and elements thereof, are provided to assist in a comprehensive understanding of the invention. Thus, it is apparent that the invention may be carried out without those defined matters. Also, well-known functions or constructions are omitted to provide a clear and concise description of exemplary embodiments of the invention.

Figure 1:
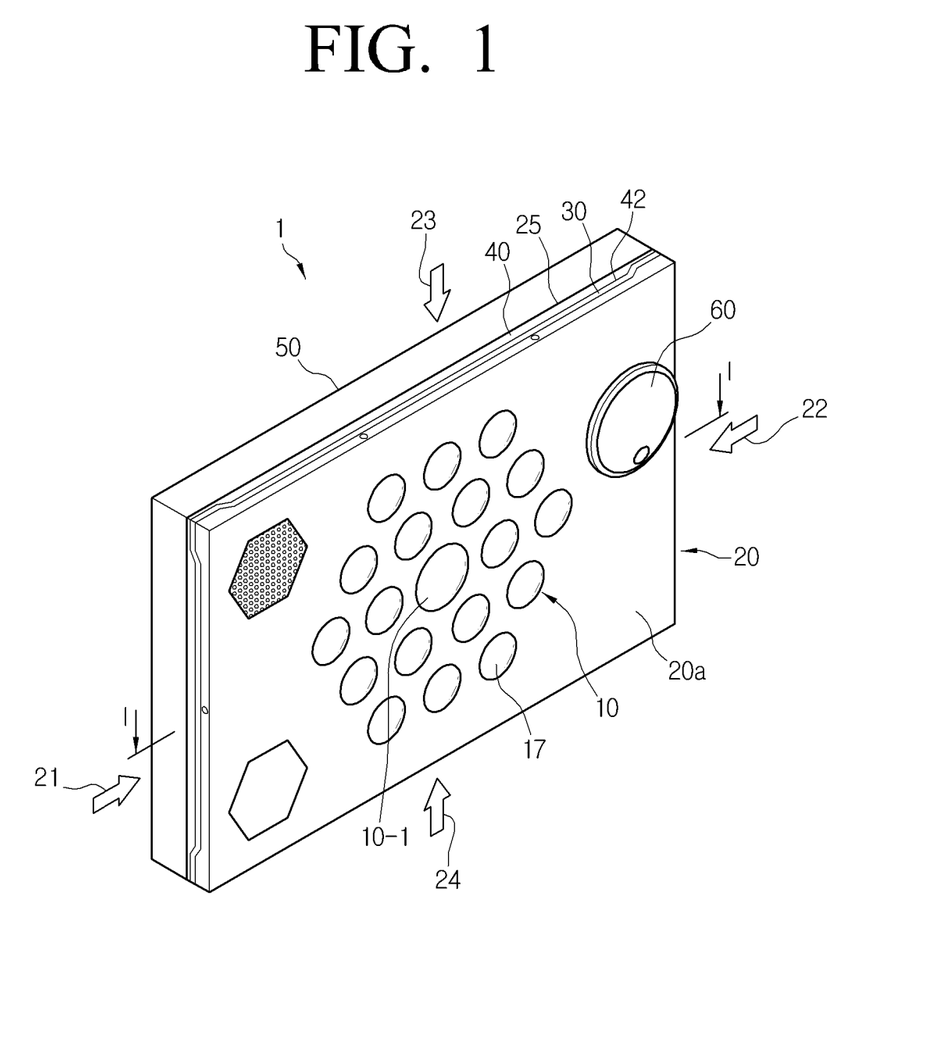
FIG. 1 is a perspective view illustrating a flexible image photographing apparatus with a plurality of image photographing units according to an exemplary embodiment of the present invention.
Figure 2:
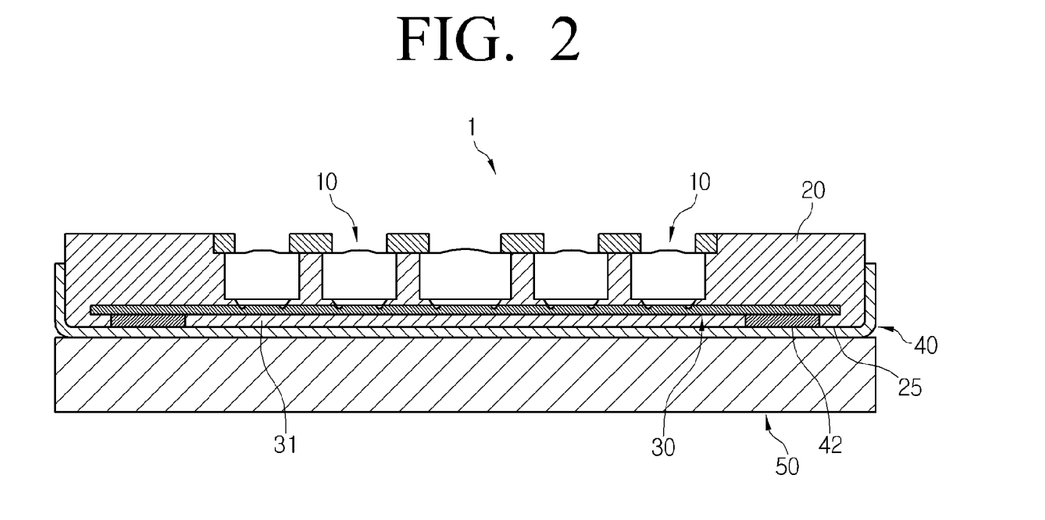
FIG. 2 is a sectional view illustrating the flexible image photographing apparatus with a plurality of image photographing units of FIG. 1 taken along a line 1-1 in FIG. 1.
Figure 3:
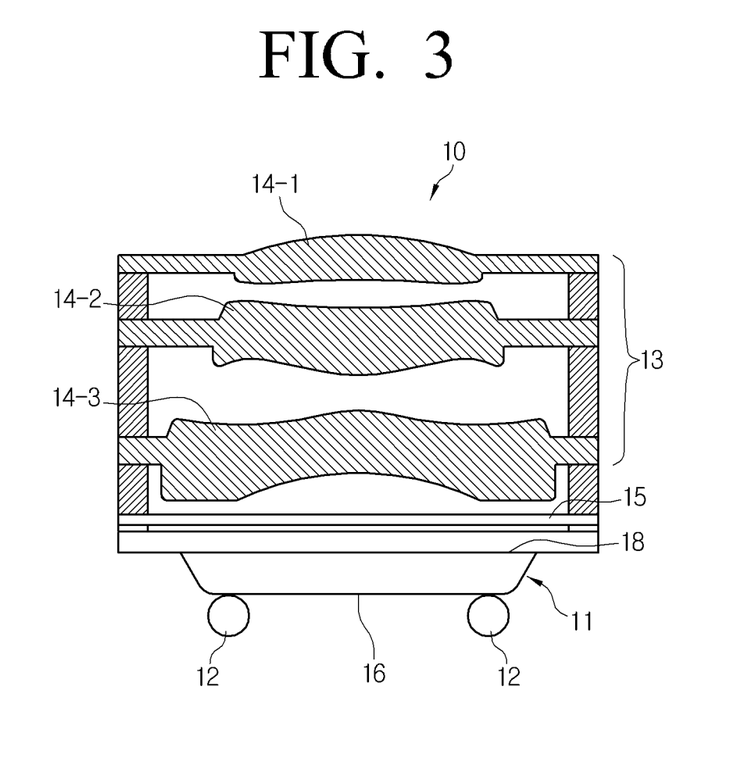
FIG. 3 is a partial sectional view illustrating the image photographing unit of FIG. 1.

FIG. 1 is a perspective view illustrating a flexible image photographing apparatus 1 with a plurality of image photographing units according to an exemplary embodiment of the invention. FIG. 2 is a sectional view illustrating the flexible image photographing apparatus 1 with a plurality of image photographing units of FIG. 1 taken along a line 1-1 in FIG. 1. FIG. 3 is a partial sectional view illustrating the image photographing unit 10 of FIG. 1.

Referring to FIGS. 1 and 2, the flexible image photographing apparatus 1 may include a plurality of image photographing units 10, a flexible body 20, a control portion 30, a rear housing 40, and a display unit 50.

Each image photographing unit 10 is formed to convert light, which enters from outside, into electrical signal and to form images of photographing objects. In this exemplary embodiment, as illustrated in FIG. 1, the flexible image photographing apparatus 1 is configured to have nineteen image photographing units 10. However, this is only one example, and this does not limit a number of the image photographing units 10 that the flexible image photographing apparatus 1 according to the exemplary embodiment may have.

Each image photographing unit 10, referring to FIG. 3, includes an image sensor 11 and a lens portion 13.

The image sensor 11 is an electric part to convert light that is reflected by the photographing object and enters through the lens portion 13 into electrical signal. A charged coupled device (CCD) image sensor, a complementary metal-oxide semiconductor (CMOS) image sensor, etc. may be used as the image sensor 11.

The image sensor 11 may have various resolutions. For example, the image sensor 11 may have resolution of about 0.3 Mpixel (mega pixel) to about 10 Mpixel. A plurality of terminals 12 to connect with the control portion 30 may be formed at a rear surface 16 of the image sensor 11. The plurality of terminals 12 may be formed to be assembled to a flexible printed circuit board of the control portion 30 using a component mounting method such as a flip chip bonding, a wire bonding, etc.

The plurality of image sensors 11 configuring the plurality of image photographing units 10 may have various resolutions as desired. For example, one of the plurality of image photographing units 10 may use an image sensor 11 having resolution higher than that of other image sensors 11 which may have the same resolution. As illustrated in FIG. 1, the flexible image photographing apparatus 1 may be formed so that a center image photographing unit 10-1 has 5 Mpixel resolution and the other eighteen image photographing units 10, each has 2 Mpixel resolution.

As another example, the plurality of image photographing units 10 may use the plurality of image sensors 11 all having the same resolution. Alternatively, the plurality of image sensors 11 forming the plurality of image photographing units 10 all may have different resolution.

The lens portion 13 is disposed proximate a front surface 18 of the image sensor 11 and allows light from outside to enter a light-receiving portion of the image sensor 11. The lens portion 13 includes one or more lenses 14-1, 14-2, and 14-3. Referring to FIG. 3, the lens portion 13 of the image photographing unit 10 according to an exemplary embodiment of the invention includes three lenses 14-1, 14-2, and 14-3. However, this is only one example; therefore, this does not limit a number of lenses 14-1, 14-2, and 14-3 forming the lens portion 13 of the image photographing unit 10. As long as the lens portion 13 can guide light from outside to the light-receiving portion of the image sensor 11, the lens portion 13 may be formed of one lens or more. A glass plate 15 may be disposed between the lens portion 13 and the image sensor 11. The glass plate 15 may prevent the light-receiving portion of the image sensor 11 from being damaged or/and being contaminated by foreign materials when manufacturing.

The lens portions 13 of the image photographing units 10 may have different focal distance, magnification, etc. In the case that the plurality of image photographing units 10 have different focal distance, when taking a picture of a photographing object, the flexible image photographing apparatus 1 according to the exemplary embodiment may provide a plurality of images being photographed at different focal distance. Therefore, in the case of an emergency or urgent photographing operation having no time to set the focus, the flexible image photographing apparatus 1 according to an exemplary embodiment of the invention can provide at least one good focused image.

Furthermore, the image photographing unit 10 may have one or more units, such as, for example, a auto focusing unit to automatically adjust the focus of the lens portion 13, a zooming unit to perform a zooming function of the lens portion 13, or a mechanical shutter.

Figure 6:
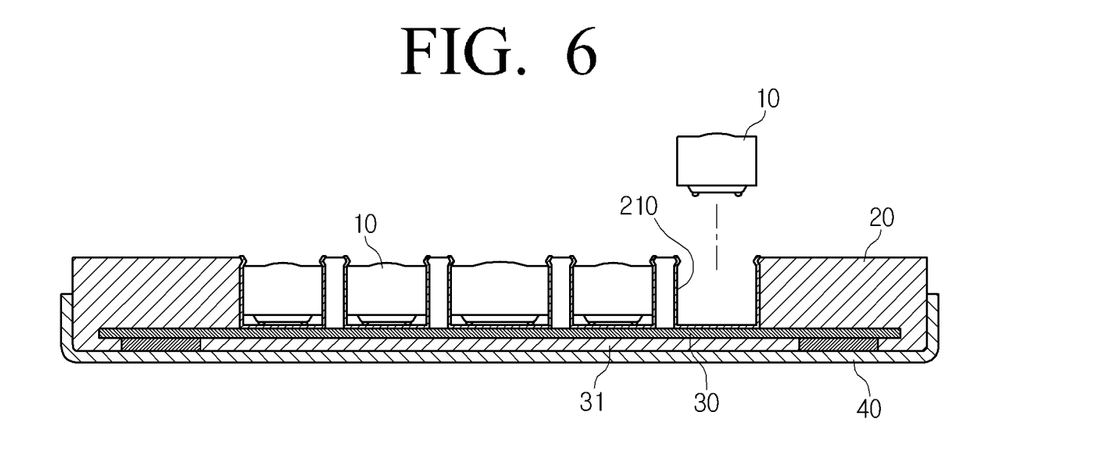
FIG. 6 is a sectional view illustrating a flexible image photographing apparatus with a plurality of image photographing units according to an exemplary embodiment of the present invention having a structure in that each of the plurality of image photographing units can be exchanged.

The image photographing units 10 having the above-described structure may be fixed to the flexible body 20 so as not to be exchangeable. In this case, a user cannot change a specification of each of the plurality of image photographing units 10 such as resolution, magnification, focal distance, etc. being determined during manufacturing. Alternatively, the image photographing units 10, as illustrated in FIG. 6, may be detachably attached to the flexible body 20 to be exchangeable. In this case, as desired, the user can exchange at least one of the plurality of image photographing units 10 with other image photographing unit 10, with different at least one of resolution, magnification, focal distance, etc.

Figure 4:
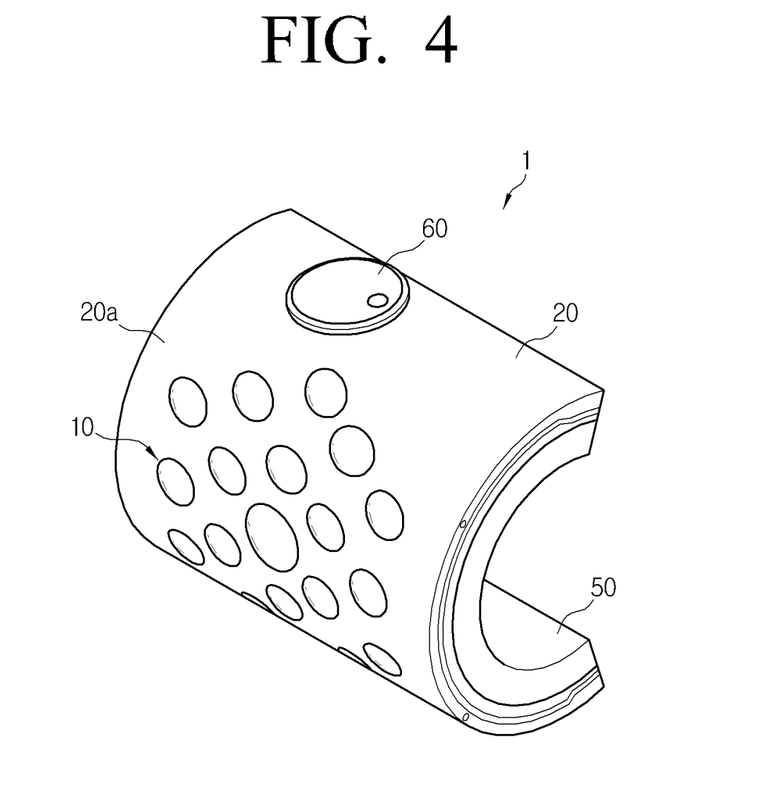
FIG. 4 is a perspective view illustrating the flexible image photographing apparatus with a plurality of image photographing units of FIG. 1 being bent in right and left directions.
Figure 5:
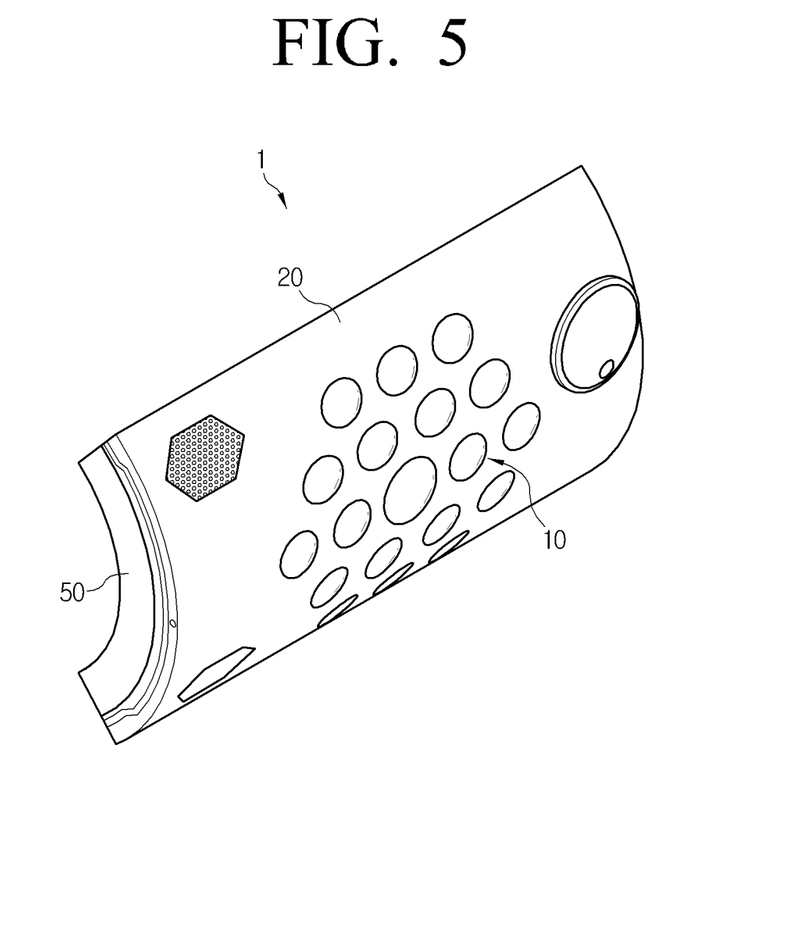
FIG. 5 is a perspective view illustrating the flexible image photographing apparatus with a plurality of image photographing units of FIG. 1 being bent in up and down directions.
Figure 9:
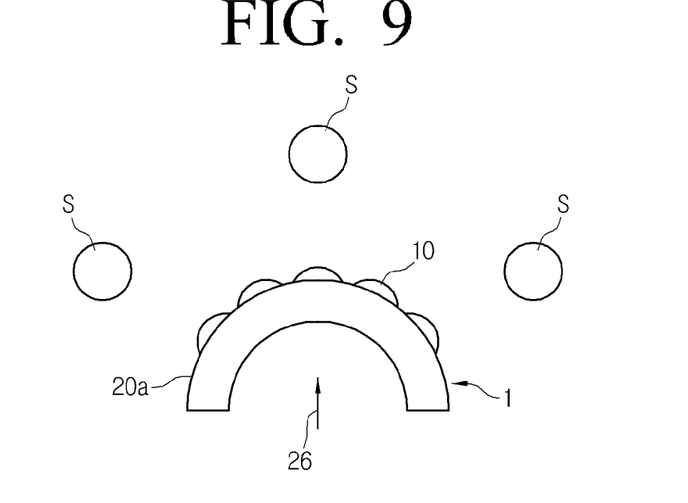
FIG. 9 is a conceptual view illustrating a state in that a flexible image photographing apparatus with a plurality of image photographing units according to an exemplary embodiment of the present invention photographs a plurality of photographing objects.
Figure 10:
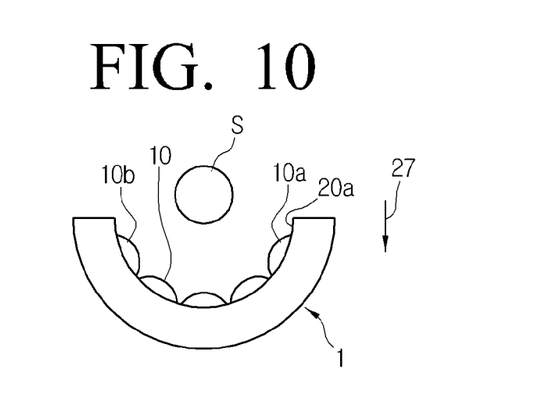
FIG. 10 is a conceptual view illustrating a state in that a flexible image photographing apparatus with a plurality of image photographing units according to an exemplary embodiment of the present invention performs a three-dimensional recognition of a photographing object.

The flexible body 20 may be formed to support and receive the plurality of image photographing units 10. When a force is applied to it, the flexible body 20 may be transformed. The flexible body 20 may be formed to freely perform various transformations such as bending transformation, twisted transformation, etc. For example, the flexible body 20 is formed so that when force is applied to the left side 21 and right side 22 of the flexible body 20 as illustrated in FIG. 1, the flexible body 20 is bent at a predetermined curvature in the width direction of the flexible body 20 as illustrated in FIG. 4. The flexible body 20 may be transformed so that a front surface 20a of the flexible body 20 becomes convex as illustrated in FIG. 9 or becomes concave as illustrated in FIG. 10. Also, the flexible body 20 may be formed so that when force is applied to the top portion 23 and bottom portion 24 of the flexible body 20 as illustrated in FIG. 1, the flexible body 20 is bent at a predetermined curvature in the height direction of the flexible body 20 as illustrated in FIG. 5.

The flexible body 20 may be soft and thin that after force is removed, the flexible body 20 can be restored to an original state. As a result, the flexible body 20 may be formed of a flexible polymer material such as poly dimethyl silicone (PDMS), etc.

If the flexible body 20 is formed of an elastic material, when the user applies force to the flexible body 20, the flexible body 20 is transformed, and after the force is removed, the flexible body 20 is restored to the original state.

An operating button 60 for operating the flexible image photographing apparatus 1 to photograph is provided on the flexible body 20. The operating button 60 may be disposed at a position at which the operating button 60 does not prevent the flexible body 20 from being transformed. In this exemplary embodiment, the operating button 60 is disposed at a right upper portion of the front surface 20a of the flexible body 20 as illustrated in FIG. 1. The operating button 60 has a function of a shutter button to allow the plurality of image photographing units 10 to photograph. Besides this, the operating button 60 may be formed to perform various functions as desired.

Alternatively, the flexible body 20 may be formed to maintain the transformed state or shape. In this case, if the user applies force to the flexible body 20 to transform the shape of the flexible body 20, even after the force is removed, the flexible body 20 maintains the transformed shape.

The control portion 30 may be disposed proximate a rear surface 25 of the flexible body 20 and may control the plurality of image photographing units 10 to photograph photographing objects and to store images. The control portion 30 may include various electric parts such as a drive integrated circuit (IC), an application-specific integrated circuit (ASIC), a memory, etc. so as to control the plurality of image photographing units 10 and other elements. The memory of the control portion 30 may store images being photographed by the plurality of image photographing units 10 and programs to control the image photographing apparatus 1 including the plurality of image photographing units 10.

Furthermore, the control portion 30 may be provided with a plurality of connecting portions with which the terminals 12 of the image sensors 11 may be electrically connected. The control portion 30 may be formed of a flexible printed circuit board on which the electrical parts are disposed so that when the flexible body 20 is transformed, the control portion 30 may be transformed integrally with the flexible body 20. A protection film 31 or a protection layer may be disposed on a rear surface of the control portion 30 to protect the control portion 30.

Furthermore, a power-supplying portion (not illustrated) to supply electrical power may be disposed at the control portion 30. A flexible battery capable of being transformed integrally with the flexible body 20 may be used as the power-supplying portion. In this case, the battery may be formed in the same size as or in the size similar to that of the control portion 30 at the rear surface of the control portion 30. Alternatively, a hard battery that cannot be transformed integrally with the flexible body 20 may be used as the power-supplying portion. At this time, the hard battery may be formed to have the size of which does not prevent the flexible body 20 or the flexible printed circuit board of the control portion 30 from being transformed.

Figure 8:
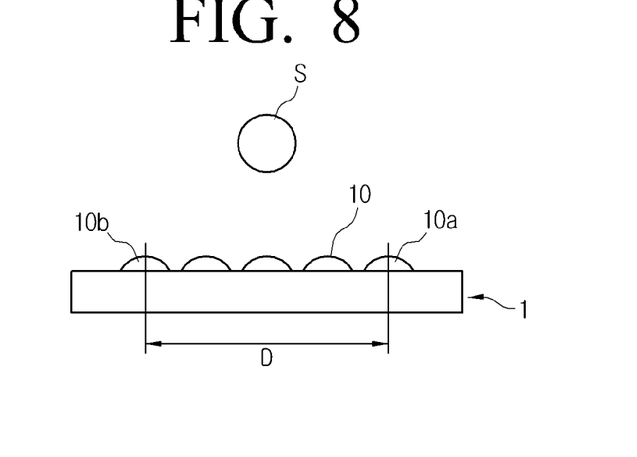
FIG. 8 is a conceptual view illustrating a state in that a flexible image photographing apparatus with a plurality of image photographing units according to an exemplary embodiment of the present invention performs a three-dimensional stereo photography.

The control portion 30 may be formed to control the plurality of image photographing units 10 to photograph in various methods. For example, the control portion 30 allows the flexible image photographing apparatus 1 according to an exemplary embodiment of the invention to be used as a stereoscopic camera or a three-dimensional camera to record a photographing object in three-dimension. For example, if a distance D between two image photographing units 10*a* and 10*b* being farthest apart from each other in right and left directions as illustrated in FIG. 8 is about 6.5 mm to about 7 mm similar to the distance between human eyes, the control portion 30 can use the two image photographing units 10*a* and 10*b* to record photographing objects S in three dimensional images.

The control portion 30 may store the images photographed by the image photographing units 10 in the memory. The control portion 30 may form a wide panoramic image using the plurality of images photographed by the plurality of image photographing units 10. As illustrated in FIG. 9, the flexible image photographing apparatus 1 is transformed so that the front light entering surface 20*a* becomes convex, that is, the front surface 20*a* is bent in a positive direction 26. After that, the plurality of image photographing units 10 may take photographs at the same time to provide a plurality of images. The control portion 30 may perform an image processing using the plurality of images to give a panoramic image. The flexible image photographing apparatus 1 according to this exemplary embodiment may provide a panorama view of approximate 180 degrees. The control portion 30 may be formed to use the wide panorama view to perform various functions such as a scene recreation function, a scene collage function, a panorama scene navigation function, an immersive vision function, etc.

Furthermore, because the flexible image photographing apparatus 1 according to an exemplary embodiment of the invention may simultaneously photograph many people and backgrounds, many people may perform videoconferencing using only one image flexible image photographing apparatus 1. The flexible image photographing apparatus 1 according to an exemplary embodiment of the invention may have good portability or/and carriability. As a result, the flexible image photographing apparatus 1 according to an exemplary embodiment of the invention may resolve the place limit caused by the videoconferencing of many people. Because the flexible image photographing apparatus 1 according to an exemplary embodiment of the invention may have the panorama view of approximate 180 degrees and over, it may be used as an apparatus to record everyday life of the user.

When the flexible image photographing apparatus 1 according to an exemplary embodiment of the invention is transformed so that the front surface 20*a* becomes concave as illustrated in FIG. 10, that is, the flexible image photographing apparatus 1 is bent in the negative direction 27, two image photographing units 10*a* and 10*b* at opposite ends may be used to record three-dimensional images with respect to a photographing object S. The plurality of image photographing units 10 may surround the photographing object S and may precisely photograph the photographing object S at close range, that is, the plurality of image photographing units 10 may perform a super macro photography. As a result, the flexible image photographing apparatus 1 according to an exemplary embodiment of the invention may be used as a three-dimensional structure understanding camera to perceive the shape of a three-dimensional structure or a cubic structure.

Furthermore, the flexible image photographing apparatus 1 according to an exemplary embodiment of the invention may simultaneously photograph photographing objects using the plurality of image photographing units 10 of which at least one condition among photographing conditions, such as focal distance, exposure, etc., is set to be different from one another in one state among the states that the flexible body 20 is flat, bent in the positive direction, or bent in the negative direction as illustrated in FIGS. 8 to 10. Alternatively, the flexible image photographing apparatus 1 may be set to photograph sequentially at regular time intervals. When the plurality of image photographing units 10 is set to photograph sequentially, the control portion 30 divides the plurality of image photographing units 10 into at least two groups of image photographing units 10, and controls the divided groups of image photographing units 10 to photograph sequentially one photographing object S. The control portion 30 may be formed so that the user can arbitrarily divide the plurality of image photographing units 10 into at least two groups of image photographing units 10. At this time, at least one image among images photographed by the plurality of image photographing units 10 may be the image that the user wants to get so that when the flexible image photographing apparatus 1 according to an exemplary embodiment of the invention is used, one photographing operation may give the wanted image without failure.

The user may set various photographing functions as described above via the display unit 50 as described below.

The rear housing 40 for protecting the control portion 30 may be disposed at the rear surface 42 of the control portion 30. The rear housing 40 may be formed of a flexible material capable of being transformed integrally with the flexible body 20. Therefore, the rear housing 40 may be formed of a flexible plastic or a flexible metal. If the flexible battery is disposed at the rear surface of the control portion 30, the rear housing 40 may be disposed behind the flexible battery.

A transformation driving portion to cause the flexible body 20 to be automatically transformed may be disposed inside the rear housing 40. The transformation driving portion may be formed to bend the flexible body 20 at a predetermined curvature according to control signals of the control portion 30. The user can set the predetermined curvature via the control portion 30. That is, the control portion 30 controls the transformation driving portion according to the setting of the user to bend the flexible body 20 at the predetermined curvature. As a result, if the flexible image photographing apparatus 1 has the transformation driving portion, the user is not required to bend directly the flexible body 20 by hands. The transformation driving portion may be formed of an electroactive polymer, a piezoelectric material, or a shape memory alloy so that the transformation driving portion applies force to the flexible body 20 and the flexible body 20 is transformed. The transformation driving portion may also be formed in a motor driving structure to use a motor in order to transform the flexible body 20. Alternatively, the rear housing 40 may be formed for itself to perform a function of the above-described transformation driving portion.

The display unit 50 may be disposed proximate the rear surface 25 of the flexible body 20, and may display images formed by the plurality of image photographing units 10. The display unit 50 may be formed to transform integrally with the flexible body 20. In this exemplary embodiment, as illustrated in FIG. 2, the display unit 50 is disposed at the rear surface of the control portion 30 and has flexibility capable of being transformed integrally with the flexible body 20. Therefore, when the flexible body 20 is transformed, the display unit 50 is also transformed. If the rear housing 40 is disposed at the rear surface of the control portion 30, the display unit 50 may be disposed at a rear surface of the rear housing 40.

Figure 7:
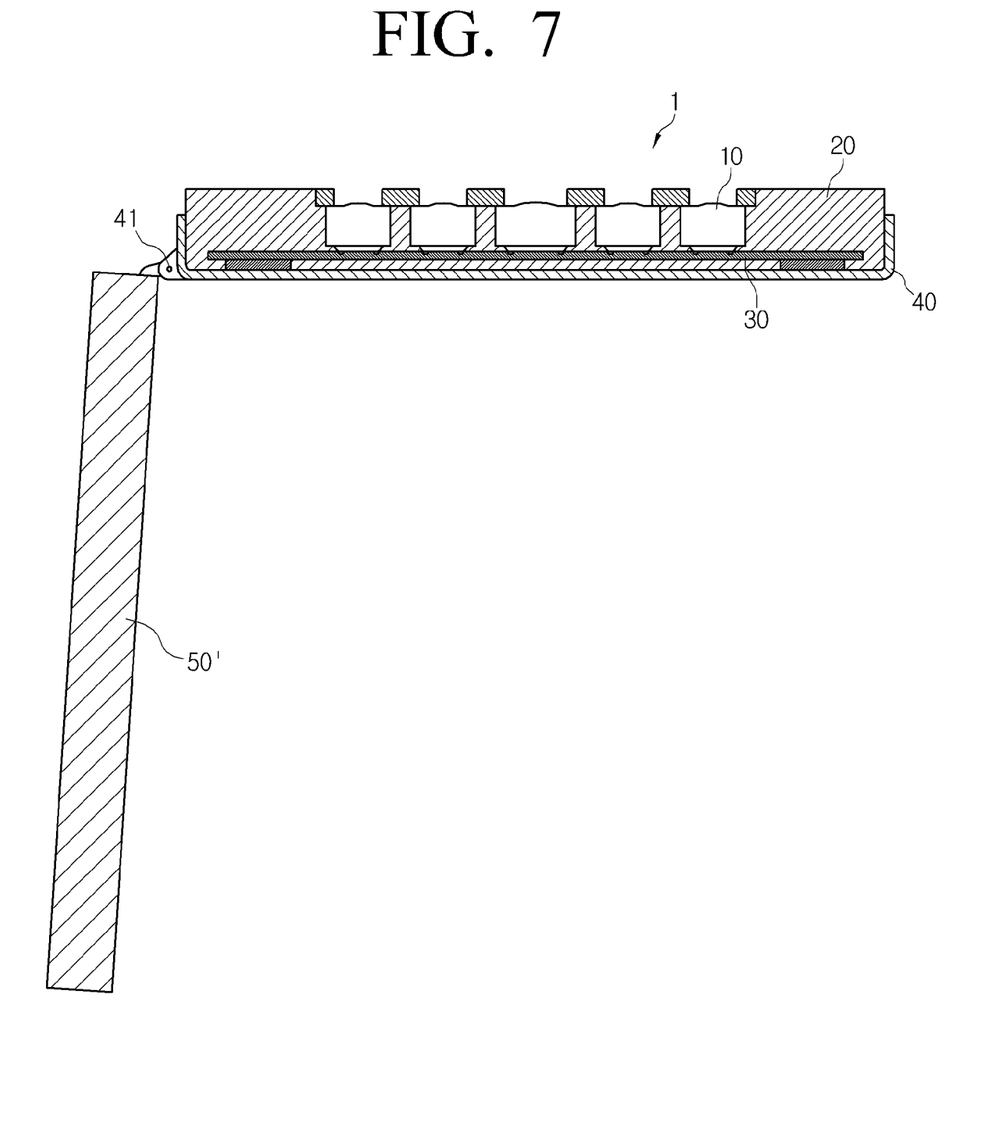
FIG. 7 is a sectional view illustrating a flexible image photographing apparatus with a plurality of image photographing units according to an exemplary embodiment of the present invention when a display unit is separated from a flexible body.

Alternatively, the display unit 50' may be formed not to transform integrally with the flexible body 20. That is, a hard display unit 50' that the user cannot easily transform like the conventional display unit may be used as the display unit. In this case, the hard display unit 50' may be disposed using a hinge 41 so as to rotate at a predetermined angle with respect to the flexible body 20 as illustrated in FIG. 7. After the user separates the display unit 50' from the rear surface of the flexible body 20 and transforms the flexible body 20, the user can photograph using various functions as described above.

To minimize the thickness of the flexible image photographing apparatus 1 according to an exemplary embodiment of the invention, the flexible body 20, the control portion 30, the rear housing 40, and the display unit 50 may be formed as thin layers. If the flexible image photographing apparatus 1 is thin, the user can transform the flexible image photographing apparatus 1 at an appropriate shape, and can carry the transformed flexible image photographing apparatus 1. Therefore, the portability or/and carriability of the image photographing apparatus 1 may be improved.

Hereinafter, operation of the flexible image photographing apparatus 1 with the plurality of image photographing units according to an exemplary embodiment of the invention will be explained with reference to FIGS. 1 to 3.

When performing a normal photographing operation, the user causes the flexible body 20 to be flat. After that, the user points the plurality of image photographing units 10 at a photographing object and pushes the operating button 60 to photograph. When the operating button 60 is pushed, the control portion 30 stores a plurality of images photographed by the image photographing units 10 in the memory. After that, according to selection of the user, the control portion 30 may combine the images photographed by the image photographing units 10 into one image and may display the image on the display unit 50. Alternatively, the control portion 30 may sequentially display the images photographed by the image photographing units 10 on the display unit 50.

When the user wants to photograph a three-dimensional image, he/she selects a three-dimension photographing mode via the display unit 50 and photographs the photographing object S. When the three-dimension photographing mode is selected, the control portion 30 uses two image photographing units 10a and 10b at right and left ends from the plurality of image photographing units 10 to photograph the photographing object S and to record the three-dimensional image of the photographing object S.

For panoramic images, the user bends the flexible image photographing apparatus 1 so that the front surface 20a becomes convex at a predetermined curvature as illustrated in FIG. 9. At this time, the predetermined curvature at which the flexible body 20 of the image photographing apparatus 1 is bent may be appropriately determined according to the panoramic image the user want to get. After that, the user selects a panorama photographing mode via the display unit 50 and photographs the photographing object S. The flexible image photographing apparatus 1 according to this exemplary embodiment can photograph the panoramic image corresponding to the panorama view of approximate 180 degrees.

The flexible image photographing apparatus 1 according to an exemplary embodiment of the invention can be used as a three-dimensional structure understanding apparatus to perceive the shape of a three-dimensional structure. In this case, the user transforms the flexible image photographing apparatus 1 so that the front surface 20a becomes concave to surround the photographing object S as illustrated in FIG. 10. After that, the user selects a structure perceiving mode via the display unit 50 and photographs the photographing object S.

In the above explanations, various photographing functions that the flexible image photographing apparatus 1 according to an exemplary embodiment of the invention can perform are explained. However, these do not limit photographing functions that the flexible image photographing apparatus 1 according to an exemplary embodiment of the invention can perform. As long as the plurality of image photographing units 10 and the flexible body 20 having flexibility capable of being bent at a predetermined curvature can be used to photograph, the flexible image photographing apparatus 1 according to an exemplary embodiment of the invention can be used in various applications.

Hereinafter, a method for manufacturing the flexible image photographing apparatus 1 with the plurality of image photographing units according to an exemplary embodiment of the invention will be explained with reference to FIGS. 11A to 11G. FIGS. 11A to 11G are process views illustrating the method for manufacturing the flexible image photographing apparatus 1 with the plurality of image photographing units 10 that is disposed at the flexible body 20 and is not exchangeable.

Figure 11A:
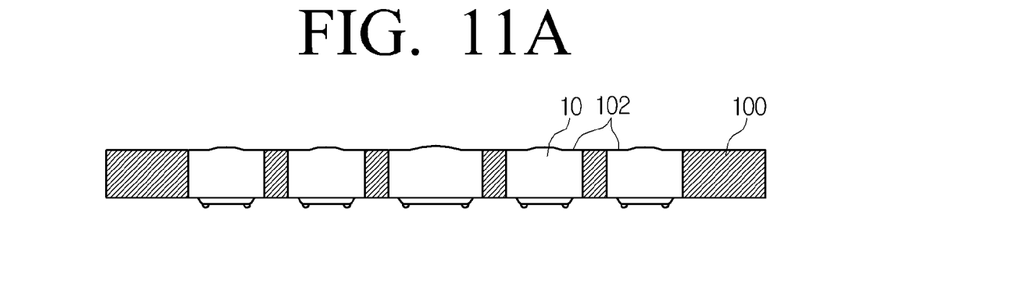
FIGS. 11A, 11B, 11C, 11D, 11E, 11F and 11G illustrate a method for manufacturing a flexible image photographing apparatus with a plurality of image photographing units according to an exemplary embodiment of the present invention.

As illustrated in FIG. 11A, an image photographing unit assembly 100 including a plurality of image photographing units 10 is formed at a wafer level. At this time, each of the plurality of image photographing units 10 is configured with an image sensor 11 and a lens portion 13 having at least one lens (see FIG. 3). The methods for manufacturing the plurality of image photographing units 10 at a wafer level are known.

Figure 11B:
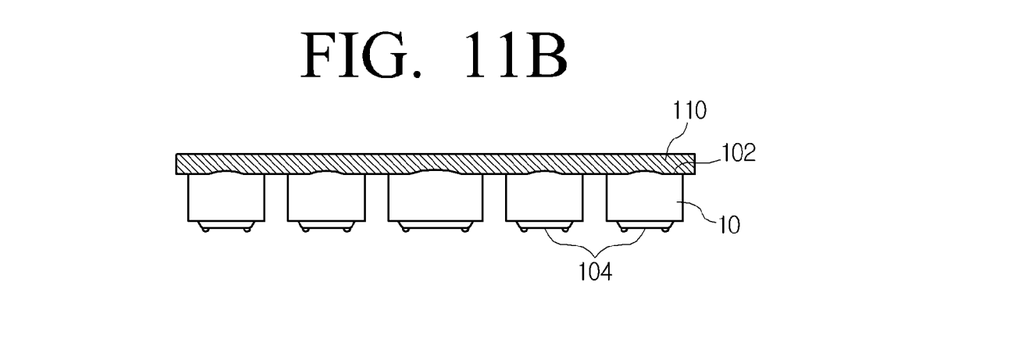

A flexible supporting film 110 is attached on top surfaces 102 of the plurality of image photographing units 10 formed in the process of FIG. 11A. After that, the image photographing unit assembly 100 which is formed at a wafer level and the plurality of image photographing units 10 is connected with one another is cut, so the plurality of image photographing units 10 is separated from one another. At this time, the supporting film 110 may not be cut. Then, the supporting film 110 connects the plurality of image photographing units 10 as illustrated in FIG. 11B so that intervals and heights between the plurality of image photographing units 10 being cut are maintained uniformly. Also, the supporting film 110 may protect top lenses of the plurality of image photographing units 10.

Figure 11C:
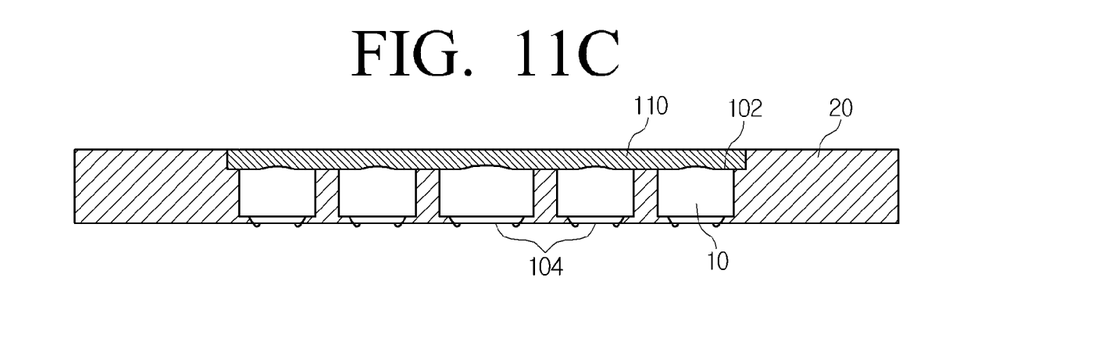

Exclusive of top and bottom surfaces 102, 104 of each image photographing unit 10, a flexible material may be used to fill around each of the plurality of image photographing units 10 so that a flexible body 20 may be formed as illustrated in FIG. 11C. Alternatively, the flexible body 20 may be molded using a mold corresponding to the shape of the flexible body 20. That is, the plurality of image photographing units 10 connected by the supporting film 110 is inserted into the mold of the flexible body, and the flexible material is filled up in the mold so that the flexible body 20 as illustrated in FIG. 11C is formed. The flexible material may permeate among the plurality of image photographing units 10, and may fix the plurality of image photographing units 10 not to come out from the flexible body 20. A flexible polymer such as a poly dimethyl silicone (PDMS), etc. can be used as the flexible material.

Figure 11D:
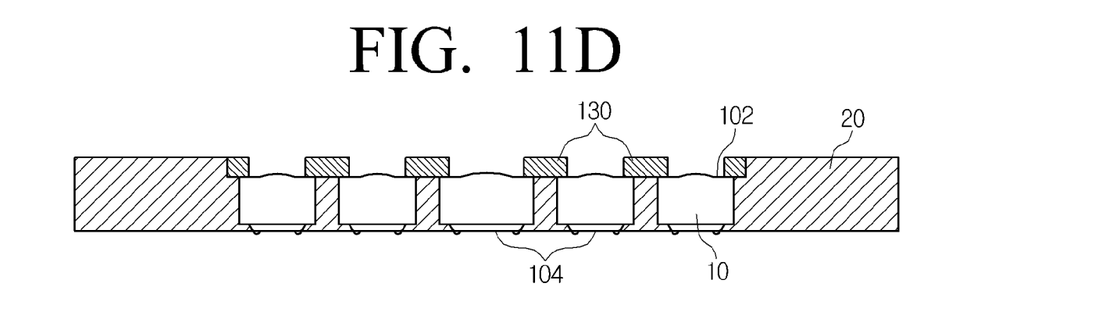

Next, the supporting film 110 is removed from the flexible body 20. After that, a blocking layer 130 to prevent the plurality of image photographing units 10 from coming out may be formed on the top surface of the flexible body 20 as illustrated in FIG. 11D. Also, protection caps 17 to protect the top lenses of the plurality of image photographing units 10 as illustrated in FIG. 1 may be disposed at the blocking layer 130.

Figure 11E:
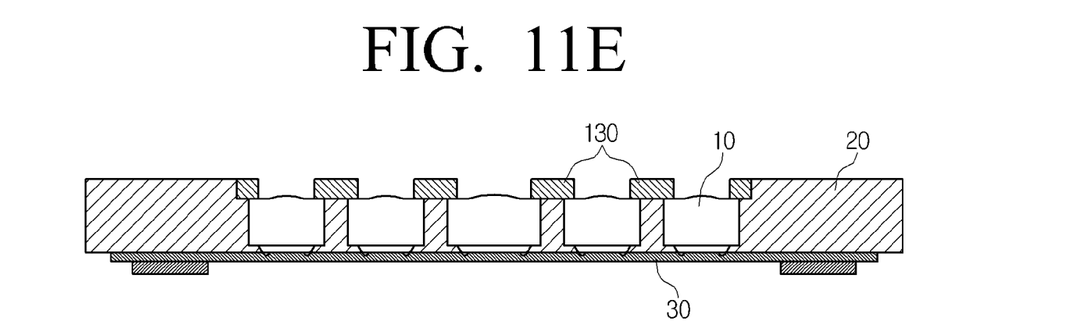

Continuously, as illustrated in FIG. 11E, a flexible printed circuit board to function as the control portion 30 may be disposed at the rear surface of the flexible body 20, and terminals 12 of the image sensor 11 being formed at the rear of each of the plurality of image photographing units 10 are electrically connected with terminals formed on the flexible printed circuit board 30. At this time, the terminals 12 of the image photographing units 10 may be assembled to the flexible printed circuit board using a component mounting method such as a flip chip bonding, a wire bonding, etc.

Figure 11F:
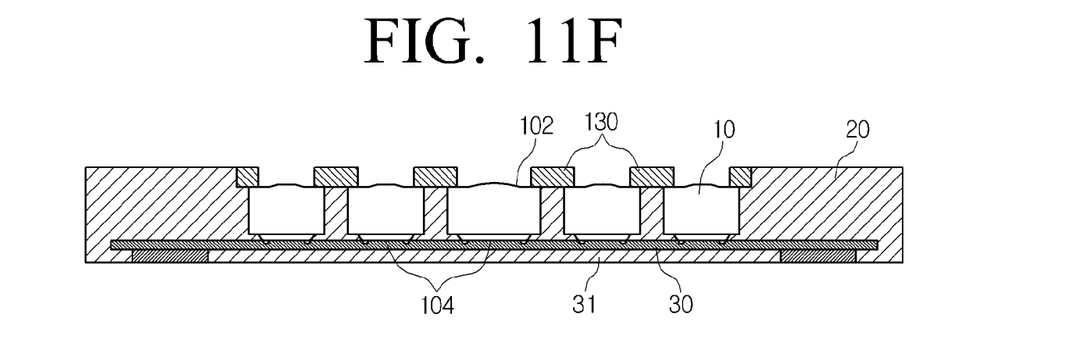

After that, in order to protect the control portion 30 being formed of the flexible printed circuit board, a protection film 31 may be attached or a protection layer may be formed at the rear surface of the control portion 30 as illustrated in FIG. 11F.

Figure 11G:
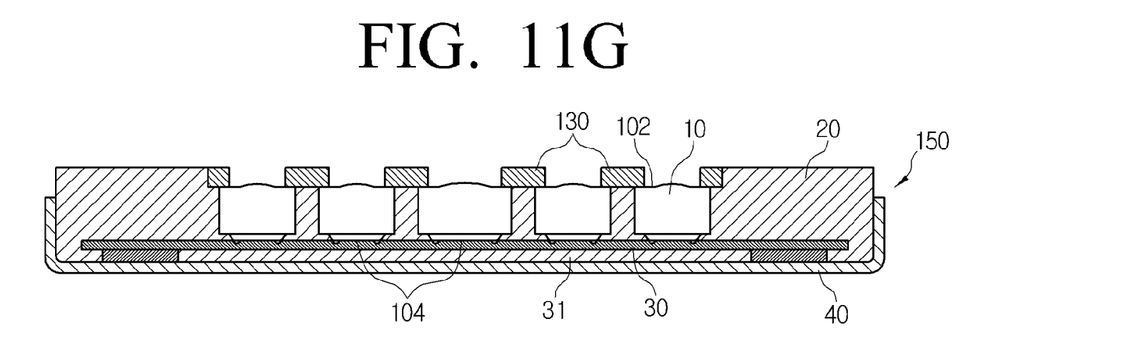

Next, as illustrated in FIG. 11G, a flexible rear housing 40 may be disposed at the bottom surface of the control portion 30 being formed of the flexible printed circuit board. Then, a main body 150 of the flexible image photographing apparatus 1 according to an exemplary embodiment of the invention is completed.

After that, a display unit 50 may be disposed at the rear surface of the rear housing 40 as illustrated in FIG. 2 as desired. Also, if a flexible thin battery is used as the power supplying apparatus, the battery may be disposed between the flexible printed circuit board 30 and the rear housing 40 or between the rear housing 40 and the display unit 50.

Figure 12A:
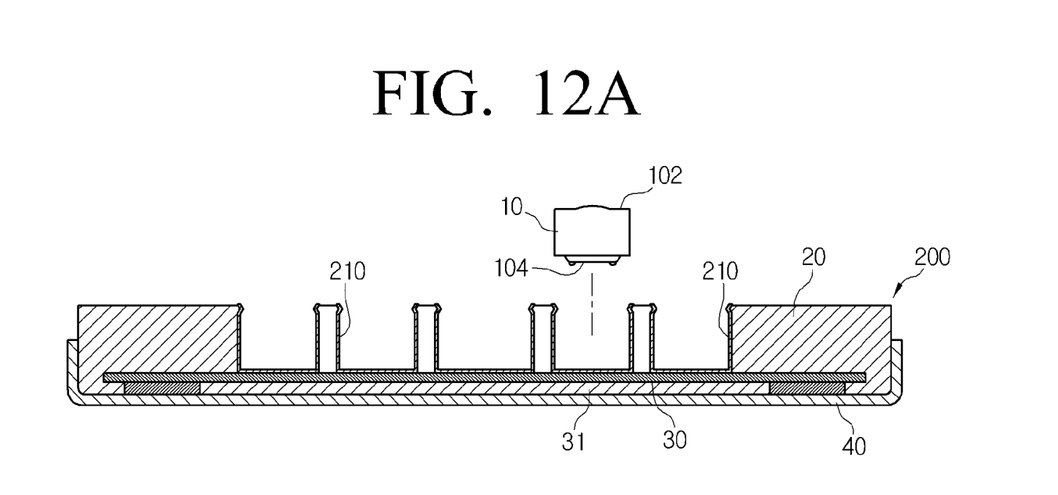
FIGS. 12A and 12B illustrate another method for manufacturing a flexible image photographing apparatus with a plurality of image photographing units according to an exemplary embodiment of the present invention.
Figure 12B:
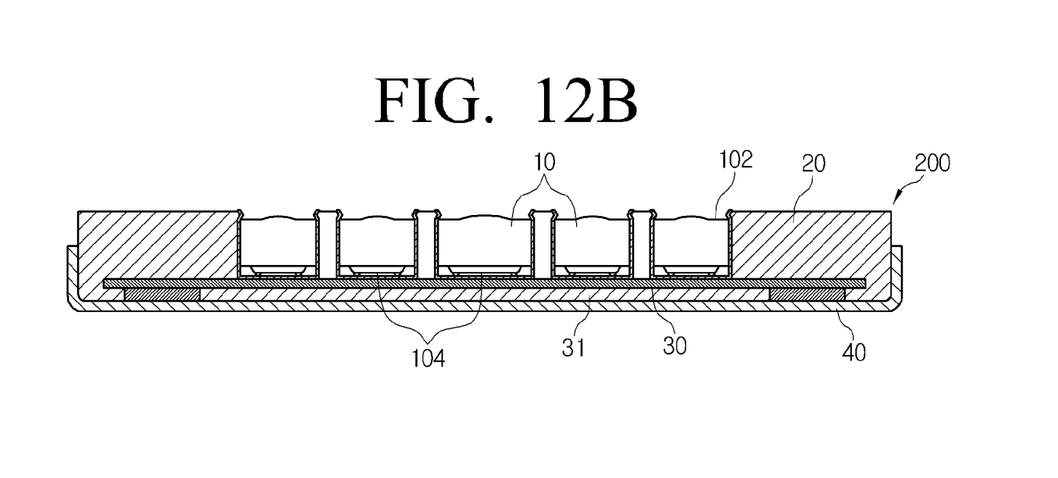

A method for manufacturing the flexible image photographing apparatus 1 with the plurality of image photographing units according to another exemplary embodiment of the invention will be explained with reference to FIGS. 12A to 12B.

First, the plurality of image photographing units 10 is prepared. The plurality of image photographing units 10 may be manufactured using various methods. For example, as described above, an image photographing unit assembly 100 including the plurality of image photographing units 10 is formed at a wafer level and is cut so that the plurality of image photographing units 10 is provided. Methods for manufacturing the plurality of image photographing units 10 are known.

In a process separated from the process in which the plurality of image photographing units 10 is manufactured, a body assembly 200 may be formed. The body assembly 200, as illustrated in FIG. 12A, may have a flexible rear housing 40 and a flexible body 20 having a plurality of sockets 210 in which the plurality of image photographing units 10 is installed. At this time, the plurality of sockets 210 may be formed so that each of the plurality of image photographing units 10 may be detachably disposed at corresponding each of the plurality of sockets 210. Therefore, the user can selectively exchange at least one of the plurality of image photographing units 10 as desired. For example, the user may separate an image photographing unit 10 having 2 Mpixel resolution from the flexible body 20, and install an image photographing unit 10 having 5 Mpixel resolution therein. A control portion 30 may be disposed between the top surface of the rear housing 40 and the bottom surface of the sockets 210. The control portion 30 may be formed of a flexible printed circuit board as described above.

Next, each of the plurality of image photographing units 10 is installed in corresponding each of the plurality of sockets 210. Then, a main body of the flexible image photographing apparatus 1 may be completed. As desired, a display unit 50 or/and a battery may be disposed as described above.

While the exemplary embodiments of the invention have been described, additional variations and modifications of the exemplary embodiments may occur to those skilled in the art once they learn of the basic inventive concepts. Therefore, it is intended that the appended claims shall be construed to include both the above exemplary embodiments and all such variations and modifications that fall within the spirit and scope of the invention.

What is claimed is:

1. A flexible image photographing apparatus comprising:
   a plurality of image photographing units formed to photograph an object;
   a flexible body to receive and install the plurality of image photographing units therein, the flexible body being formed to be transformed in shape when a force is applied thereto; and
   a control portion disposed at the flexible body, which controls the plurality of image photographing units to photograph the object and stores images of the photographed object,
   wherein the control portion comprises a flexible printed circuit board,
   wherein the flexible body comprises a display unit to display the images of the object photographed by the plurality of image photographing units, and
   wherein the flexible body, the control portion, and the display unit are formed in a single body, and the display unit is transformed integrally with the control portion and the flexible body.

2. The flexible image photographing apparatus of claim 1, wherein each of the plurality of image photographing units comprises:
   an image sensor to convert light reflected by the object into an electrical signal; and
   a lens portion disposed in front of the image sensor, which lens portion comprises at least one lens to allow the light to enter the image sensor.

3. The flexible image photographing apparatus of claim 2, wherein the image sensor of a selected image photographing unit has a resolution higher than the image sensors of other image photographing units.

4. The flexible image photographing apparatus of claim 2, wherein each image sensor has the same resolution.

5. The flexible image photographing apparatus of claim 2, wherein the image sensors have resolution different from one another.

6. The flexible image photographing apparatus of claim 2, wherein each image photographing unit comprises:
   at least one of an auto focusing function, a mechanical shutter function, and a zooming function.

7. The flexible image photographing apparatus of claim 2, wherein the lens portions have focusing distance and magnification different from one another.

8. The flexible image photographing apparatus of claim 1, wherein, after the force is removed, the flexible body maintains the transformed shape.

9. The flexible image photographing apparatus of claim 1, wherein, after the force is removed, the flexible body restores to an original state.

10. The flexible image photographing apparatus of claim 1, wherein the control portion one of:
    controls the plurality of image photographing units to photograph the object at the same time, and divides the plurality of image photographing units into at least two groups of image photographing units and controls the divided groups to photograph the object in a regular sequence.

11. The flexible image photographing apparatus of claim 1, wherein the control portion controls the plurality of image photographing units to perform at least one of a panoramic photography, a three-dimensional photography, and a super-macro photography.

12. The flexible image photographing apparatus of claim 1, wherein each image photographing unit is disposed at the flexible body and is exchangeable.

13. The flexible image photographing apparatus of claim 1, further comprising:
 a transformation driving portion to transform the flexible body corresponding to a signal from the control portion.

14. The flexible image photographing apparatus of claim 13, wherein the transformation driving portion comprises at least one of:
 an electroactive polymer,
 a piexoelectric material,
 a shape memory alloy, and
 a motor driving structure.

15. A method for manufacturing a flexible image photographing apparatus, comprising:
 manufacturing a plurality of image photographing units at a wafer level;
 attaching a supporting film to top surfaces of the image photographing units;
 cutting the plurality of image photographing units manufactured at a wafer level so that the plurality of image photographing units is connected with one another only by the supporting film;
 filling a flexible material around each image photographing unit to form a flexible body, exclusive of top and bottom surfaces of the image photographing units, the flexible body being formed to be transformed in shape when a force is applied thereto;
 removing the supporting film;
 attaching a control portion formed of a flexible printed circuit board to a rear surface of the flexible body, and
 disposing a display unit to display the images of the object photographed by the plurality of image photographing units, to a rear surface of the control portion,
 wherein the flexible body, the control portion, and the display unit are formed in a single body, and the display unit is transformed integrally with the control portion and the flexible body.

16. The method of claim 15, wherein, after the supporting film is removed, forming a blocking layer at a top surface of the flexible body to protect the plurality of image photographing units.

17. The method of claim 15, further comprising:
 disposing a flexible rear housing between the control portion and the display unit.

18. A method for manufacturing a flexible image photographing apparatus, comprising:
 manufacturing a plurality of image photographing units in a first process;
 preparing a body assembly including a control portion, a display unit and a flexible body in a second process separate from the first process; and
 inserting the plurality of image photographing units to be installed in the flexible body,
 wherein the flexible body is formed to be transformed in shape when a force is applied thereto, and
 wherein the flexible body, the control portion, and the display unit are formed in a single body, and the display unit is transformed integrally with the display unit and the flexible body.

19. The method of claim 18, wherein the flexible body comprises:
 a plurality of sockets into which the plurality of image photographing units is detachably installed.

20. A photographing apparatus comprising:
 a flexible body comprising a flexible transformable material to be transformed in shape when a force is applied thereto;
 image modules arranged to be accommodated in the flexible body, which image modules take photographs of an object of interest, each image module comprising:
 a lens disposed proximate a front surface of the flexible body, on which lens light reflected from the object of interest impinges, and
 an imaging sensor, which receives the reflected light from a corresponding lens and converts the received light into electrical signals representative of images; and
 a control portion comprising a flexible transformable layer coupled to a rear surface of the flexible body and the image sensors, which controls the image modules to take the photographs of the object of interest and stores images of the photographs,
 wherein the flexible body comprises a display unit to display the images of the object photographed by the plurality of image photographing units, and
 wherein the flexible body, the control portion, and the display unit are formed in a single body, and the display unit is transformed integrally with the control portion and the flexible body.

21. The apparatus of claim 20, wherein the imaging sensor of each image module has a pre-selected resolution and wherein the image modules arranged in the flexible body detachably.

22. The apparatus of claim 21, wherein the lens of each image module has a pre-selected focal length and magnification.

23. The apparatus of claim 20, wherein the flexible body comprises a rectangular shape transformable into one of a convex and concave shape in one of a horizontal and vertical direction with respect to a longer dimension of the rectangular shape.

* * * * *